(No Model.) 2 Sheets—Sheet 1.

E. KERBS & A. ARMELLINI.
APPARATUS FOR PRODUCING ACETYLENE.

No. 599,241. Patented Feb. 15, 1898.

Witnesses.

Inventors
Emilio Kerbs,
Alessandro Armellini.
By James L. Norris
Atty.

(No Model.) 2 Sheets—Sheet 2.

E. KERBS & A. ARMELLINI.
APPARATUS FOR PRODUCING ACETYLENE.

No. 599,241. Patented Feb. 15, 1898.

Witnesses.
Robert Everett
F. B. Keefer

Inventors.
Emilio Kerbs,
Alessandro Armellini.
By James L. Norris.
Atty.

UNITED STATES PATENT OFFICE.

EMILIO KERBS AND ALESSANDRO ARMELLINI, OF MILAN, ITALY.

APPARATUS FOR PRODUCING ACETYLENE.

SPECIFICATION forming part of Letters Patent No. 599,241, dated February 15, 1898.

Application filed March 29, 1897. Serial No. 629,807. (No model.) Patented in Italy July 30, 1896, LXXXII, 52.

*To all whom it may concern:*

Be it known that we, EMILIO KERBS and ALESSANDRO ARMELLINI, residing at Milan, in the Kingdom of Italy, have invented certain new and useful Automatic Apparatus for Producing Acetylene, (for which we have obtained Letters Patent of Italy, dated July 30, 1896, Vol. 82, N. 52, R. A.,) of which the following is a specification, reference being had to the accompanying drawings.

Our invention relates to that type of gas-generating apparatus in which a calcium or other suitable carbid is caused to unite with water for the production of acetylene gas.

It is our purpose to provide an apparatus of this character having such organization that the supply of gas shall be regulated automatically in proportion to the rate of consumption.

It is a further purpose of our invention to provide an apparatus of the type mentioned in which the parts are so constructed and combined that carbid may be supplied without interrupting either the process of generation or the supply of the gas to the point or points where it is consumed.

Our invention consists, therefore, in the novel features of construction and new combinations of parts hereinafter fully described, and then particularly pointed out and defined in the claims which conclude this specification.

To enable those skilled in the art to which our said invention pertains to clearly understand and to make and use the same, we will now describe said invention in detail, reference being had for this purpose to the accompanying drawings, in which—

Figure 1:
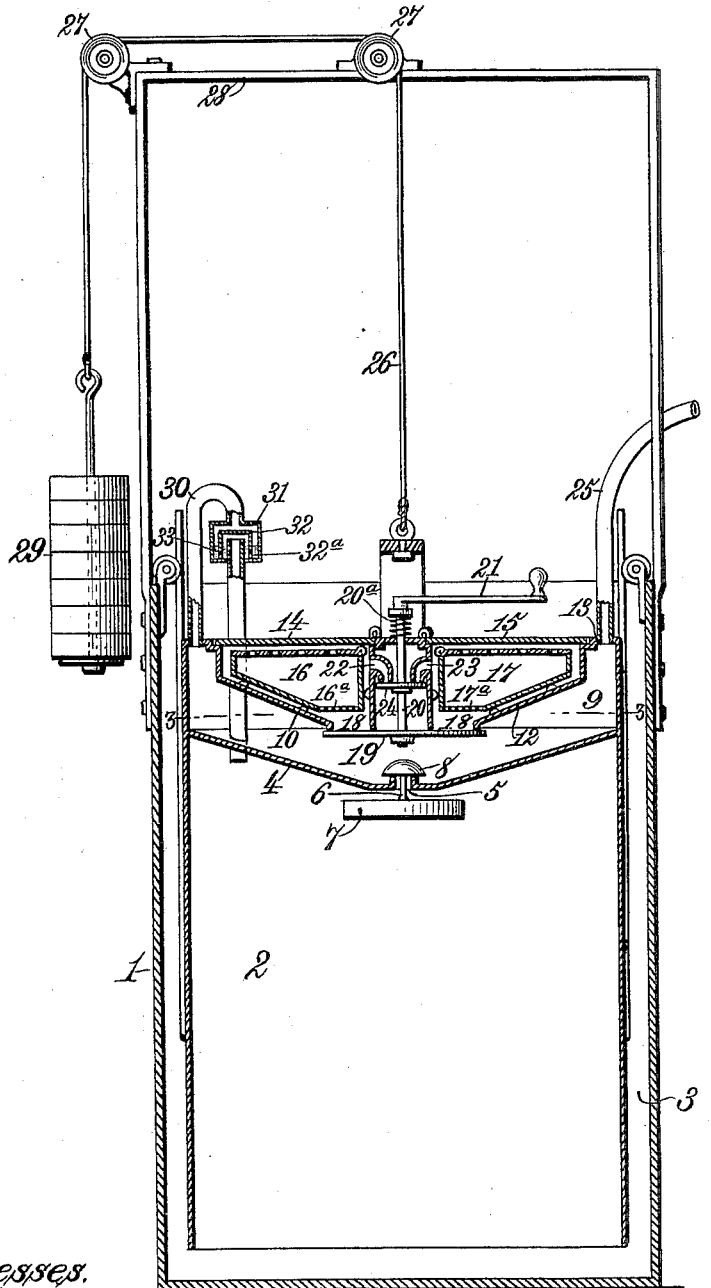
Figure 2:
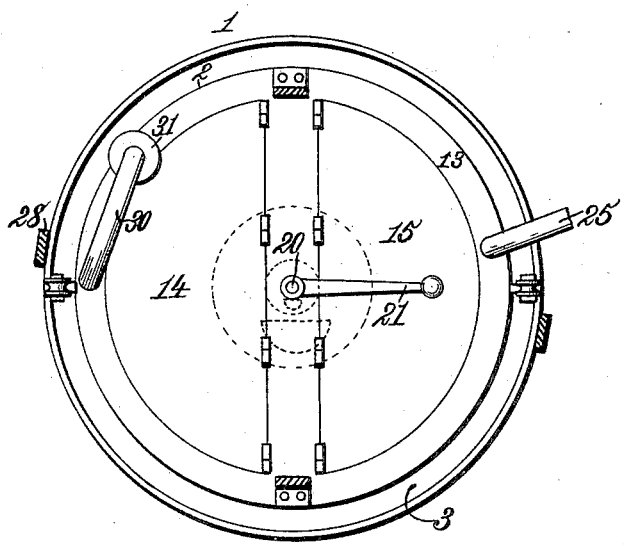
Figure 3:
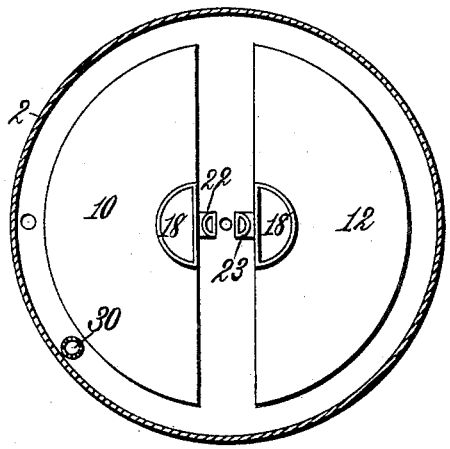
Figure 4:
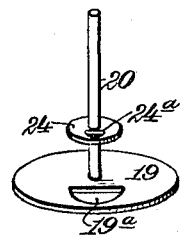

Figure 1 is a central vertical section of an apparatus in which our invention is incorporated. Fig. 2 is a plan view of the parts shown in Fig. 1. Fig. 3 is a horizontal section upon the line 3 3 in Fig. 1, looking upward. Fig. 4 is a detail perspective view of the shaft and disks which close the openings in the lower portions of the casings and the open ends of the gas-exit tubes, said parts being disconnected from the apparatus.

The reference-numeral 1 in said drawings indicates a vessel of cylindrical or other suitable form, within which is arranged a second bell 2, of somewhat less diameter, so that a space 3 is left between the two vessels. The bell 2 is open at its lower end, but closed at the upper end, and water is introduced in such quantity that it rises in both vessels 1 and 2 to the same point, filling the vessel 1 to about three-fourths of the entire depth of said vessel. Somewhat below its upper end the bell 2 is closed by a partition 4, which is lowest at its central point, where an aperture 5 is provided, in which lies a valve-stem 6, having a float 7 upon its lower end, which is a little below the lowest point of the partition 4. Upon the upper end of said valve-stem is a valve 8, which descends upon and closes the aperture 5 when the float is not buoyed up by the water lying in the bell 2.

Above the partition 4 a chamber 9 is provided, lying between said partition and two semicircular casings 10 and 12, which are placed above the partition, its top being closed by a circular wall 13, which extends over the entire upper end of the bell 2, save that said wall 13 is provided with two semicircular hinged lids 14 and 15, which close apertures of corresponding form and by which access may be had to the interior of either casing 10 or 12. Within said casings removable baskets 16 and 17 are arranged to contain the carbid, which is introduced by means of hinged tops upon said baskets. Said tops are perforated to permit gas to pass out into the chamber 9. Said baskets are also provided with perforated portions 16ª and 17ª to admit water, which enters the chamber 9 through the aperture 5, the valve 8 being opened by the rise of the float 7. In the bottom of each casing is a semicircular opening 18, immediately beneath which is a plate 19, of circular form and having such diameter as to extend over both open spaces 18. In said plate is an opening 19ª, (shown in Fig. 4,) similar in shape to the openings 18 and in such position as to coincide with either one of the latter as the disk 19 is turned upon its center. Said disk is rigidly mounted on a shaft 20, centrally and vertically arranged between the two casings. The upper end of the shaft rises above the wall 13 and has an arm 21, by which it may be turned in such manner as to bring the opening 19ª into coincidence with either opening 18, while the solid portion of the disk covers and effectually closes the corresponding opening in the other casing. Thus when one of said casings is open at the aperture 18 the other will be closed. The shaft 20 is held up by a spring 20ª in order to press the disk closely against the edges of the opening 18.

From the interior of the casings 10 and 12 gas-exit pipes 22 and 23 lead into the space between the casings, said space forming part of the chamber 9. Upon the shaft 20 is a disk 24, mounted centrally and horizontally in such relation to the semicircular plate 19 that when the latter closes the bottom of either casing the plate 24 will simultaneously close the gas-exit pipe leading from the same casing. Said disk has an opening 24ª, Fig. 3, which opens the gas-exit pipe belonging to the same casing, having its lower portion opened by the aperture 19ª in the disk 19. When this adjustment of the described parts is made, the lid closing the top opening of the casing which is closed by the disks 19 and 24 can be opened, the basket contained therein can be removed, and the lime resulting from the action of water upon the carbid can be emptied and a fresh charge supplied. The basket is then replaced and at the proper time the same operation is carried out with the other casing and basket, the process of generation and gas consumption being uninterrupted.

The gas is removed from the chamber 9 by a pipe 25. The bell 2 is sustained at any point in the vessel 1 by a cord 26, running over pulleys 27, arranged on a frame 28, the necessary counterpoise being obtained by weights 29. Communication is afforded from the chamber 9 to the interior of the bell, below the partition 4, by a pipe 30, one end of which penetrates the wall 13, the other end being in the partition 4. The pipe 30 is provided with a cup-valve consisting of a hollow casing 31, which is entered by both portions of the pipe, the lower part of the latter rising somewhat above the bottom of the casing 31. Within said casing a cup 32 is arranged, the open end of the lower part of the pipe 30 entering said cup and rising above its lower edge, which has a series of perforations 32ª near its margin. Sufficient mercury 33 is placed in the casing 31 to cover said perforations, but not rising as high as the open end of the pipe.

The operation of the parts is as follows: When no gas is collected in the chamber 9, the bell 2 will descend by the preponderance of its own weight until the float 7 is lifted and water caused to enter the chamber 9. Should the evolution of gas rise above the volume consumed, the pressure in the chamber 9 will cause the mercury in casing 31 to pass into the cup 32, in which it rises until the perforations 32ª are uncovered. The gas then flows through the pipe 30 into the bell, below the partition 4, thereby causing said bell to rise, whereupon the valve 8 closes, and as water cannot reach the carbid the generation of gas decreases and finally ceases.

When gas is again drawn from the chamber 9, the preponderance of pressure in the bell 2 will cause said gas to return through the pipe 30. Thereupon the bell 2 will sink until the water again lifts the float 7 and valve 8, whereupon water enters and the generation of gas begins again.

What we claim is—

1. In an apparatus for generating acetylene gas the combination with a vessel constructed to contain a body of water, of a bell having its open end downward and lying in the water in said vessel, said bell having a partition below its upper end to form a gas-chamber above said partition, casings arranged in said gas-chamber and provided with gas-outlets and with openings for the entrance of water, a valve in the partition for the passage of water, and means for closing the openings and gas-outlets in said casings, substantially as described.

2. In an apparatus for generating acetylene gas, the combination with a vessel constructed to contain water, of a bell having its open end downward and lying in a body of water in said vessel, said bell having a partition to form a gas-chamber below its upper end and above said partition, a float-valve to close an opening in the center of said partition, casings arranged in said gas-chamber and provided with gas-outlets and with apertures for the admission of water and means for closing the gas-outlet and aperture in one casing while the aperture and the gas-outlet in the other casing remain open, substantially as described.

3. In an apparatus for the manufacture of acetylene gas, the combination with a vessel constructed to contain a body of water, of a bell having its closed end downward and lying in said water, said bell having a partition below its upper end, a float-valve in an aperture in said partition, two casings in the gas-chamber above said partition and removable through hinged lids, and disks carried by and adapted to turn with a central shaft to close an aperture in the bottom of one casing and a gas-exit pipe leading from said casing, while the aperture and gas-exit pipe of the other casing remain open, substantially as described.

4. In an apparatus for generating acetylene gas, the combination with a vessel constructed to contain water, of a bell having its open end downward and suspended in a body of water in said vessel, said bell having a partition below its closed upper end to form a gas-chamber, gas-generating devices between the closed upper end of said vessel and said partition, a float-valve to open and close an aperture in said partition, a tube leading from said gas-chamber upward and above the closed upper end of the bell and thence back through the same and into the space below the partition and a cup-valve in said tube, substantially as described.

5. In an apparatus for generating acetylene gas, the combination with a vessel constructed to contain a body of water, of a bell having its open end downward and lying in said water, said bell having an apertured partition below its closed upper end to form a gas-chamber, means arranged in said chamber for the generation of gas, a tube opening through the closed upper end of said bell and rising above the same, then bent and carried through the gas-chamber and partition, and a cup-valve in said tube consisting of a casing inclosing a break in said pipe, a cup inverted in said casing and entered by the open end of the lower part of the pipe, and a body of mercury rising above perforations in the edge of said cup but having its normal level below the end of the inclosed pipe, substantially as described.

In witness whereof we have hereunto set our hands in presence of two witnesses.

EMILIO KERBS.
ALESSANDRO ARMELLINI.

Witnesses:
OFFRICSO LARRASI,
GIACOMO GUARMERI.